United States Patent
Chen (10) Patent No.: US 6,930,296 B2
(45) Date of Patent: Aug. 16, 2005

(54) APPARATUS, METHOD AND SYSTEM FOR FOOD MANAGEMENT AND FOOD INVENTORY

(76) Inventor: Johnson Chen, Unit 4, 69 St. Marks Road, Ladbroke Grove, London W10 6JG (GB)

( * ) Notice: Subject to any disclaimer, the term of this patent is extended or adjusted under 35 U.S.C. 154(b) by 8 days.

(21) Appl. No.: 10/658,843

(22) Filed: Sep. 9, 2003

(65) Prior Publication Data

US 2005/0051528 A1 Mar. 10, 2005

(51) Int. Cl.$^7$ ................................................ H05B 6/78
(52) U.S. Cl. ........................ 219/700; 219/388; 99/486
(58) Field of Search ................................. 219/700, 701, 219/388, 634, 620; 99/451, DIG. 14, 443 R, 443 C, 325, 386, 486; 198/838, 502.1; 186/44

(56) References Cited

U.S. PATENT DOCUMENTS

| | | | | |
|---|---|---|---|---|
| 2,666,519 A | * | 1/1954 | Boots | 198/838 |
| 3,895,691 A | * | 7/1975 | Shiraishi | 186/44 |
| RE29,767 E | * | 9/1978 | Futch | 186/44 |
| 5,415,251 A | * | 5/1995 | Akimoto | 186/49 |
| 5,897,807 A | | 4/1999 | Edgar et al. | 219/700 |
| 6,232,585 B1 | * | 5/2001 | Clothier et al. | 219/620 |
| 6,431,318 B1 | * | 8/2002 | Tanaka | 186/49 |
| 6,664,520 B2 | * | 12/2003 | Clothier | 219/634 |
| 2002/0108506 A1 | * | 8/2002 | Shimizu | 99/486 |
| 2003/0006281 A1 | * | 1/2003 | Thomas et al. | 235/385 |
| 2004/0099506 A1 | * | 5/2004 | Kunimune et al. | 198/502.1 |

FOREIGN PATENT DOCUMENTS

| | | | | |
|---|---|---|---|---|
| EP | 0749080 A2 | | 12/1996 | G06F/17/16 |
| JP | 07-073373 | | 3/1995 | G06G/1/12 |
| JP | 10201599 | * | 8/1998 | A47G/23/08 |
| JP | 2000-339547 | | 12/2000 | G07G/1/12 |

* cited by examiner

Primary Examiner—Robin O. Evans
Assistant Examiner—Leonid M Fastovsky
(74) Attorney, Agent, or Firm—Thomas, Kayden, Horstemeyer & Risley, LLP (57) ABSTRACT

An automated food handling system for food servings comprising a transfer means for transporting food servings therealong; a plurality of treatment modules coupled in parallel to the transfer means; means for sensing and recognizing the type of food servings being transported on the transfer means; and means for automatically diverting the food serving from the transfer means into one of the treatment modules. The treatment modules may be machines that bring the food servings to the desired temperature. An inventory system is also provided.

43 Claims, 5 Drawing Sheets

APPARATUS, METHOD AND SYSTEM FOR FOOD MANAGEMENT AND FOOD INVENTORY

FIELD OF INVENTION

The present invention relates to an apparatus, method and system for food management and food inventory and in particular to automated handling, ordering and/or inventory systems.

BACKGROUND OF INVENTION

Japanese sushi tei (sushi train) restaurants are increasing in popularity. In these restaurants, ready to eat food servings (eg. different types of sushi, sashimi, buns, Chinese wet dim sum, etc.) in bases (eg. saucers or bowls) are conveyed across long dining tables in front of customers via a conveyor belt. In other similar restaurants, the bases are placed on top of model train platform carriages which are towed by a model train running on tracks. Customers sit side by side along the long tables facing the conveyor belt or model train and select their own food items by taking the food serving bases from the conveyor belt or train.

Different food servings are usually placed on different colour/pattern bases to denote the price of that particular food serving. After a meal, the customer's bill is calculated by adding the serving prices of all the different colour/pattern bases.

In these restaurants, it would be desirable to maintain food freshness as much as possible. Often, the conveyor belts or train tracks of such restaurants can stretch for more than 50 meters, as they, for example, travel along one side of a first table, down the other side of the first table, to the kitchen, around both sides of a second table and then back to the kitchen and the first table. The food servings can therefore travel and be exposed to normal room temperature for a considerable period, especially if such food servings are not selected by customers. It is therefore important for quality control to ensure their freshness to gain customer satisfaction.

It is the object of the present invention to provide a system for food management which addresses one or more of the above issues and which provides advantages over the prior art.

SUMMARY OF INVENTION

In accordance with one aspect of the present invention, it is recognized in the present invention that different types of food must be handled differently according to their nature in the same quality control system. For example, it may be desirable to reheat some warm food items while recooling some cold food items to ensure their freshness. It is also desirable to remove food servings that are "too old".

It is also recognized that such reheating or recooling of the food items should be performed automatically for a system to be efficient and effective. Often, there can be hundreds of food servings on the conveyor belt/train and it would be too laborious to remove such servings for reheating or recooling. Further, different types of food should be reheated differently (e.g. fried foods should be reheated by a "dry" heater, while steamed food should be reheated in a steamer to prevent drying out). Further, some food items may have been freshly added to the conveyor belt/train and may not require reheating or recooling. These food items should not be handled to avoid unnecessary work as well as disruption to the food flow.

In another aspect, it is also recognized that to further improve the quality of the products and quality of the service an inventory system is preferably provided to keep track of a number of different items of information to the restaurateur. Such a system may provide the kitchen with information on which particular food servings are being depleted, such that they can prepare the appropriate servings accordingly and add the same to the conveyor belt/train. Such a system may also provide the restaurateur with information such as customer eating patterns, for example which particular servings are popular at different times of the day/month/year. This will enable the restaurateur to anticipate such demand and order appropriate amounts of food material, as well as preparing the particular food servings at specific times. From a customer point of view, such a system may provide the customer with information which shows the servings consumed and the current bill total. Such a system may also allow the customer to order specific food servings, show special restaurant offers and other information.

Having recognized the issues discussed above, the present invention in one aspect provides an automated food handling system for food servings comprising a transfer means for transporting food servings therealong; a plurality of treatment modules coupled in parallel to the transfer means; means for sensing and recognizing the type of food servings being transported on the transfer means; and means for automatically diverting the food serving from the transfer means into one of the treatment modules. The treatment modules may be machines that bring the food servings to the desired temperature. In a preferred implementation, the transfer means includes a conveyor system with a conveyor path and the treatment modules include means for bringing food servings in the conveyor path to a desired temperature. The means for automatically diverting the food serving includes a plurality of diverging conveying path, each path leading to one of the treatment modules and further includes an actuating means for transferring a food serving to a designated treatment module.

In a preferred embodiment, the present invention includes a food conveyor system wherein food servings on bases are conveyed on an automated conveyor, the conveyor having a customer section and a food service section, wherein the food service section includes an entry point; at least two food processing conveyor paths extending from the entry point, at least one of the food processing conveyor paths including a means for bringing food servings in the conveyor path to a desired temperature; a means for diverting food serving bases at the entry point to one of the conveyor paths; the conveyor paths rejoining each other at a food service section exit point which rejoins the customer section.

The present invention in another aspect provides a food management and inventory system for a food outlet wherein food servings on bases are conveyed along an automated conveying system having a customer section and a food service section, the system characterised in that the bases are individually electronically identifiable.

The present invention in another aspect provides a method of managing food supply and food inventory in a food outlet wherein food servings on bases are conveyed along an automated conveyor system a customer section and a food service section, wherein the bases or packaging are individually electronically identifiable, the method including the steps of:

entering information into a computer regarding each food serving introduced to the conveyor including the base identification number and the type of food serving on the base;

using at least one sensor at the food service section to identify all the bases currently on the conveyor; and sending the information in relation to the bases currently on the conveyor to the computer for performing an inventory to determine the food servings currently on the conveyor and the food servings being depleted at the customer section.

In a further preferred embodiment, the computer is able to further recall the appropriate preparation program through identifying the food item and applying the relevant heating or cooling procedures to serve the food item. For example, a food items required it to be steamed first, then oven grilled. The system is able to a. identify the food item (say from its electronically identity tag, which may be a RFID or Barcode, etc.);
b. recall the appropriate preparation procedure to apply to the food item. In some cases, the preparation methodology could already be embedded into a digital device on the packaging of the food item, in which case, the system will read, translate and apply the appropriate preparation program;
c. apply the appropriate preparation program; and
d. release the food item into the conveyor track or notify staff that the food is ready to be served.

Using a system according to the features provided in the present invention, food items can be prepared and reheated correctly before serving to the customers, rather than the conventional way of being done manually by chefs in the kitchen. Such conventional methods tend to contain inconsistencies caused by variability of the way different individuals handle the various tasks. On the other hand, the present system and method ensures consistency of quality and taste by streamlining and automating the food preparation and cooking process.

BRIEF DESCRIPTION OF FIGURES

Preferred embodiments of the present invention will now be described with reference to the accompanying drawings, wherein.

DETAILED DESCRIPTION

In the following description, the term "bases" refers to any container suitable for holding the food or other items, including but not limited to plates, bowls, trays and any other holders or packaging, made of any suitable material, including but not limited to metal, ceramic, porcelain, paper, plastic or Styrofoam and polyethylene wrapping.

Figure 1:
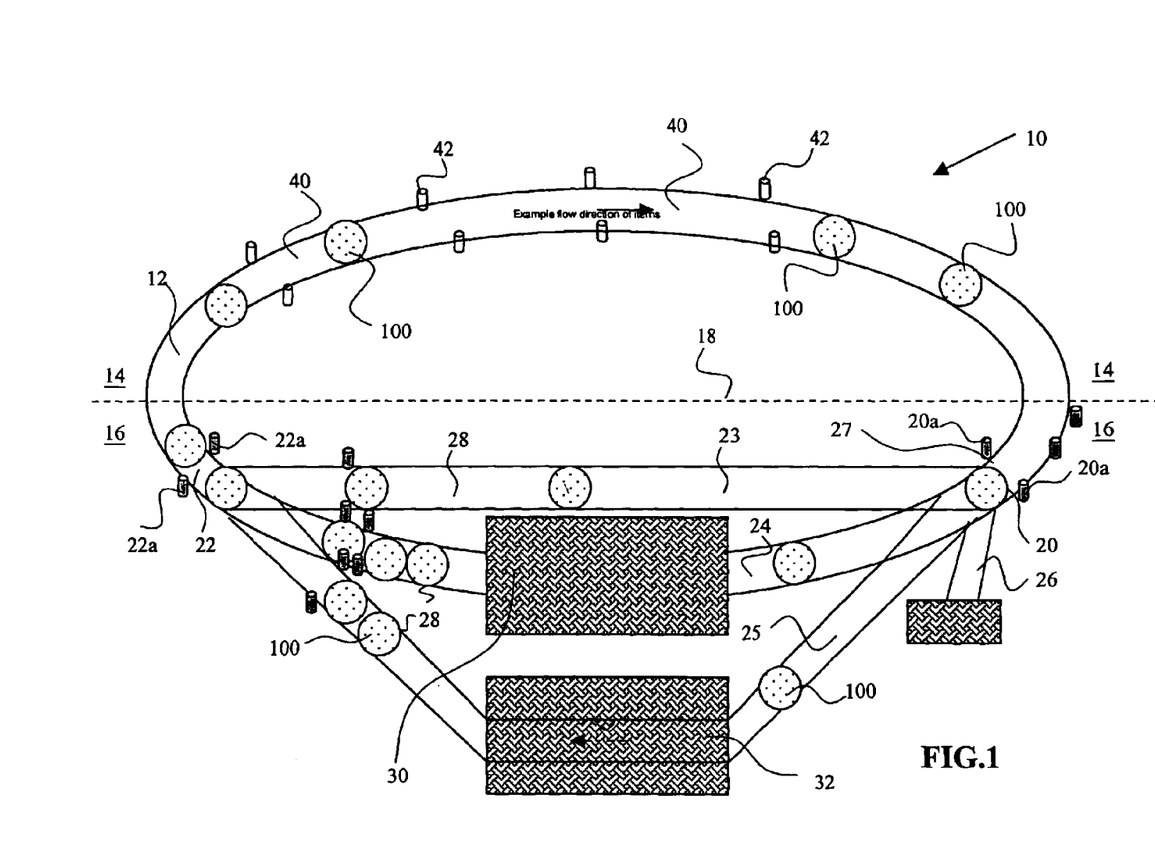
FIG. 1 is a layout diagram of a food conveyor system for a sushi train restaurant according to an embodiment of the present invention.

FIG. 1 is a layout diagram of a food conveyor system 10 for a sushi train restaurant according to an embodiment of the present invention. The conveyor system 10 includes a closed loop conveyor 12 which is divided into a customer section 14 and a food service section 16 by imaginary line 18. The customer section 14 corresponds to the part of the conveyor 12 on top of the customer dining tables (not shown). The food service section 16 corresponds to the part of the conveyor 12 behind the kitchen or food preparation area (not shown), which is not accessible to customers. Food servings are placed in bases 100 (eg. saucers, plates or bowls) which are conveyed along the conveyor 12 in a clockwise direction as illustrated.

The food service section 16 of the conveyor 12 includes an entry point 20, an exit point 22 and, as in this illustration shows, having three alternative food processing conveyor paths 23–25 therebetween. The food processing conveyor paths 23–25 include a bypass path 23, a heating path 24, and cooling path 25. A removal track 26 also extends from the entry point 20. A switching mechanism 27 is disposed at the entry point 20 in order to divert bases 100 to one of the food processing conveyor paths 23–25 or removal track 26, as will be explained below. The food processing conveyor paths 23–25 rejoin each other adjacent the exit point 22. Each food processing conveyor path 23–25 includes a buffer section 28 for re-entry of the bases 100 in these paths 23–25 to the conveyor customer section 14. The entry point 20 and exit point 22 include sensors 20a and 22a, respectively.

The heating path 24 includes a heating means 30, which can comprise a conventional oven, a microwave oven, grill, steamer or fryer. The cooling path 25 includes a cooling means 32, which can comprise a cooler. The purpose of the heating means 30 and cooling means 32 will be explained further below.

Figure 2:
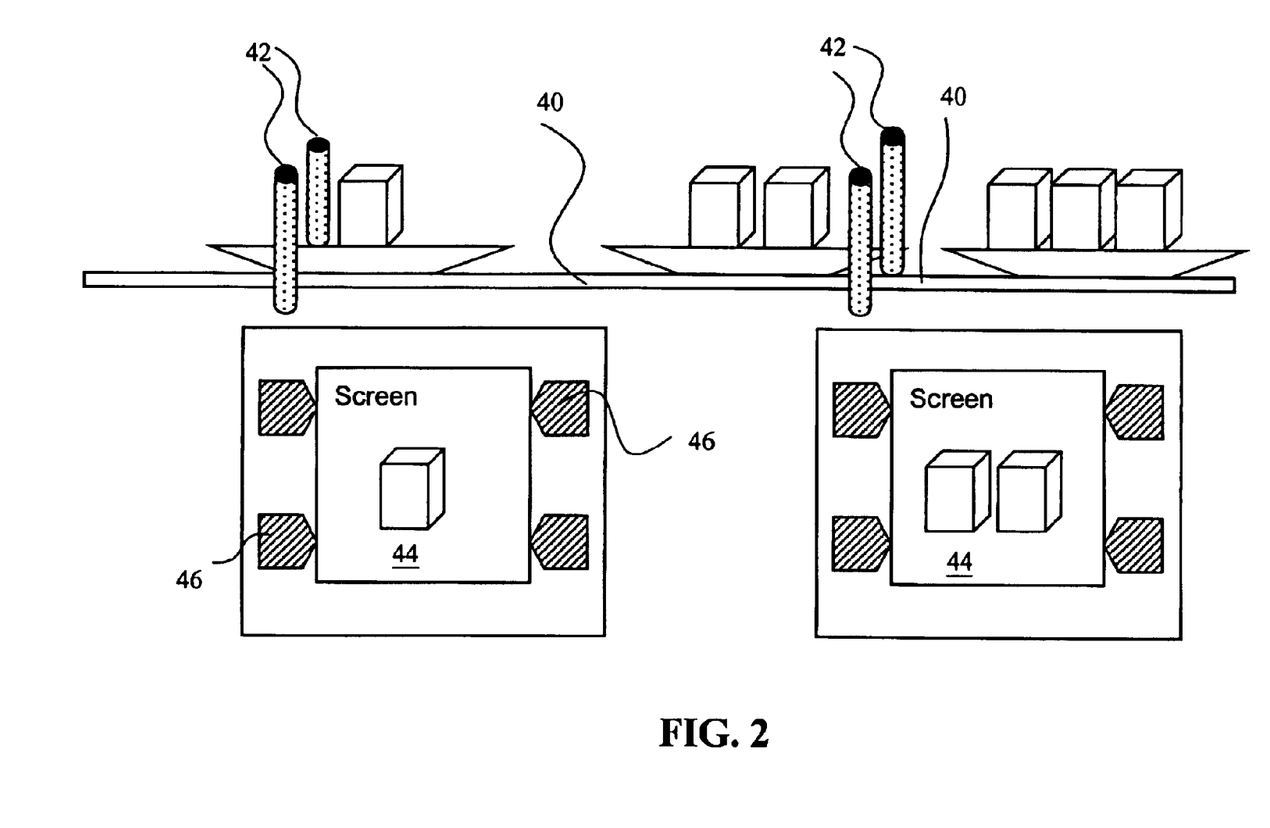
FIG. 2 is a diagram of customer terminals for the conveyor system according to FIG. 1.

The customer section 14 is divided into a number of customer stations 40, with details shown in FIG. 2. These customer stations 40 correspond to the individual seats along the customer dining tables. As shown in FIG. 2, customer station sensors 42 are arranged adjacent each customer station 40. Each station 40 also includes a customer screen 44 with option buttons 46. Predetermined information for example nutritional information, ingredients used, food background are displayed on the screen of the computer. The purpose of the sensors 42, screen 44 and buttons 46 will be described below.

Figure 3:
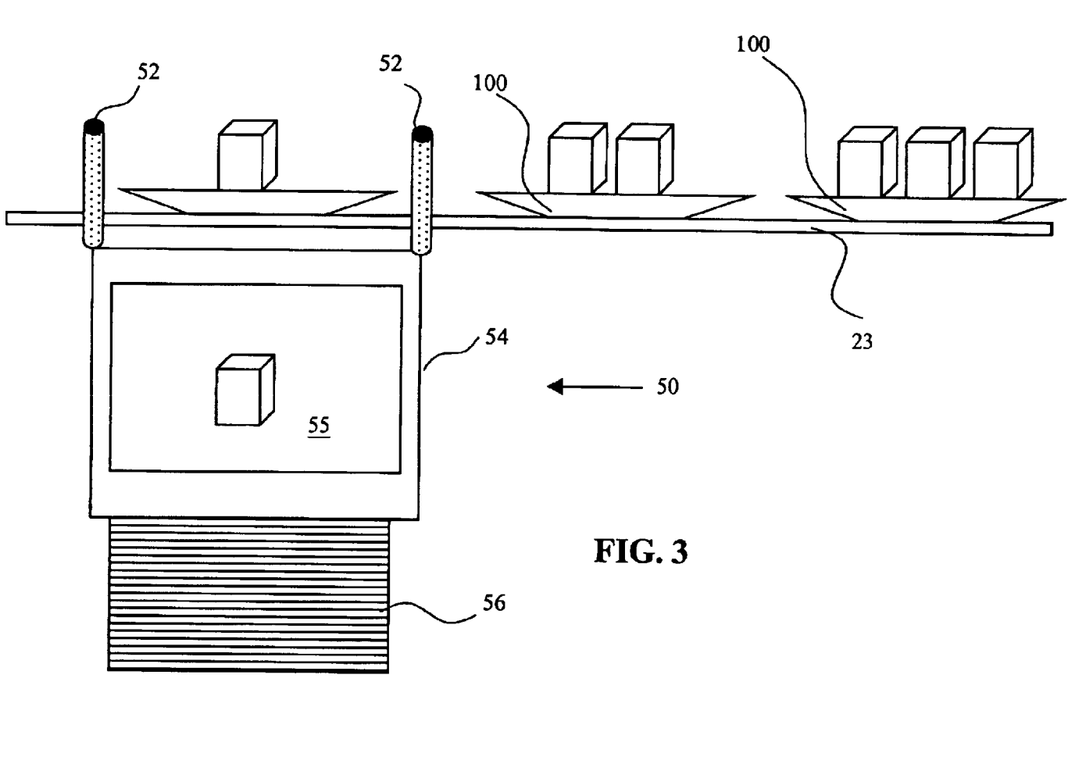
FIG. 3 is a diagram of a kitchen terminal for the conveyor system according to FIG. 1.

FIG. 3 shows a diagram of a kitchen terminal 50 for the conveyor system 10. The kitchen terminal 50 is located along the bypass path 23 of the conveyor 12. The kitchen terminal 50 includes sensors 52 and a computer 54 with a screen 55 and keyboard 56.

The operation of the conveyor system 10 will now be described. Firstly, food servings are placed in bases 100 which are individually electronically identifiable. The bases 100 have an electronically identifiable tag such as, but not limited to, a barcode or radio frequency (RF) identification attached thereto. The bases 100 with the food servings are introduced to the conveyor system 10 at the kitchen terminal 50 (at the bypass path 23 of the conveyor 12). The information for each particular food serving, which includes the base identification number, the type of food serving in that base 100 and its time of introduction into the conveyor 12 are then entered into the computer 54. This can be done in a variety of ways. One way is to scan the base 100 using the kitchen terminal sensors 52, which will provide its identification no. and time of introduction to the computer 54. Restaurant staff can then enter what food serving is placed on that base 100. The other method is to enter the food serving information manually on the computer.

From the bypass path 23, the bases 100 join the customer section 14 of the conveyor 12. If the food servings are not selected by customers in the customer section 14, their bases 100 will enter the food service section 16. The entry point sensors 20a will then determine the base identification no.

and relay the same to the computer 54. Using the food serving information for that food serving, the food "exposure time" (the time that food serving has been circulating in the conveyor 12) is determined by the computer 54. The computer 54 then decides which of the service paths 23, 24 or 25 or removal track 26 each food serving will follow and operates the switching mechanism 27 to guide that base 100 to one of the service paths 23 to 25 or to the removal track 26.

If the food serving has a low exposure time (ie. it has only been placed on the conveyor system 10 for a short time) or if the food serving does not require reheating/recooling (eg. certain types of buns, certain types of sushi), the food bases 100 of such food servings are diverted to the bypass path 23 by the switching mechanism 27 where they merely travel to the exit point 22. At the exit point 22, these food servings rejoin the customer section 14 of the conveyor 12. Food servings that require reheating are diverted by the switching mechanism 27 to the heating conveyor 24 to bring the temperature of the food to the desired level as predetermined. Similarly, food servings that require recooling are diverted by the switching mechanism 27 to the cooling path 25 to also bring the temperature of the food to the desired level. Food servings that have an exposure time higher than a predetermined time for that particular food serving (ie. the food is "too old") are diverted by the switching mechanism 27 to the removal track 26, for manual removal by staff.

The entry point sensor 20*a* and/or exit point sensor 22*a* are also used to identify the food servings and to perform an inventory, which includes the types of food servings in the conveyor 12, the quantity of each food serving and which food servings are being depleted. This information is relayed to the computer 54 and shown to staff. This allows staff to prepare/not prepare food servings as required, which ensures sufficient and consistent food supply in the conveyor 12 and which also avoids wastage. Other functions of the inventory system will be described below.

At each customer station 40 (FIG. 2), the customer station sensor 42 detects and identifies the particular food serving moving across the customer. The food serving type and price is displayed on the customer screen 44. If the food serving is taken by the customer, the food serving type and price are also identified by the sensor 42 and displayed on the customer screen 44, as well as the current total bill. The food serving information for the serving consumed is also sent to the computer 54 for the inventory system. This allows staff to monitor the type and amount of food servings being consumed via the computer if desired.

The customer screen 44 also allows the customer to order specific food servings from the kitchen via the option buttons 46 and in the desired language. These requests are sent to the computer 54 and alerted to staff members. Staff will then prepare the specific food serving and place the same on the conveyor 12. When the specific food serving is approaching the customer, the customer will be alerted via his screen 44. Other customers may also be alerted via their individual screens 44 that this specific food serving is a special order and is not available to them. If the special order item is taken by a different customer even after a warning is displayed, a system alarm may sound in order to again alert the customer as well as staff. The other customers may however be given information in relation to the food serving such that they may also order the same. When the customer takes the food serving from the conveyor, this can be confirmed to the staff by the inventory system. Alternatively, the specific food serving can be delivered manually to the customer by staff. The customer may also request his bill via the option buttons 46. The bill can then be displayed on the customer screen 44. As mentioned above, the customer's current bill total can be constantly displayed on the screen, and may be electronically or manually paid if desired.

Figure 4:
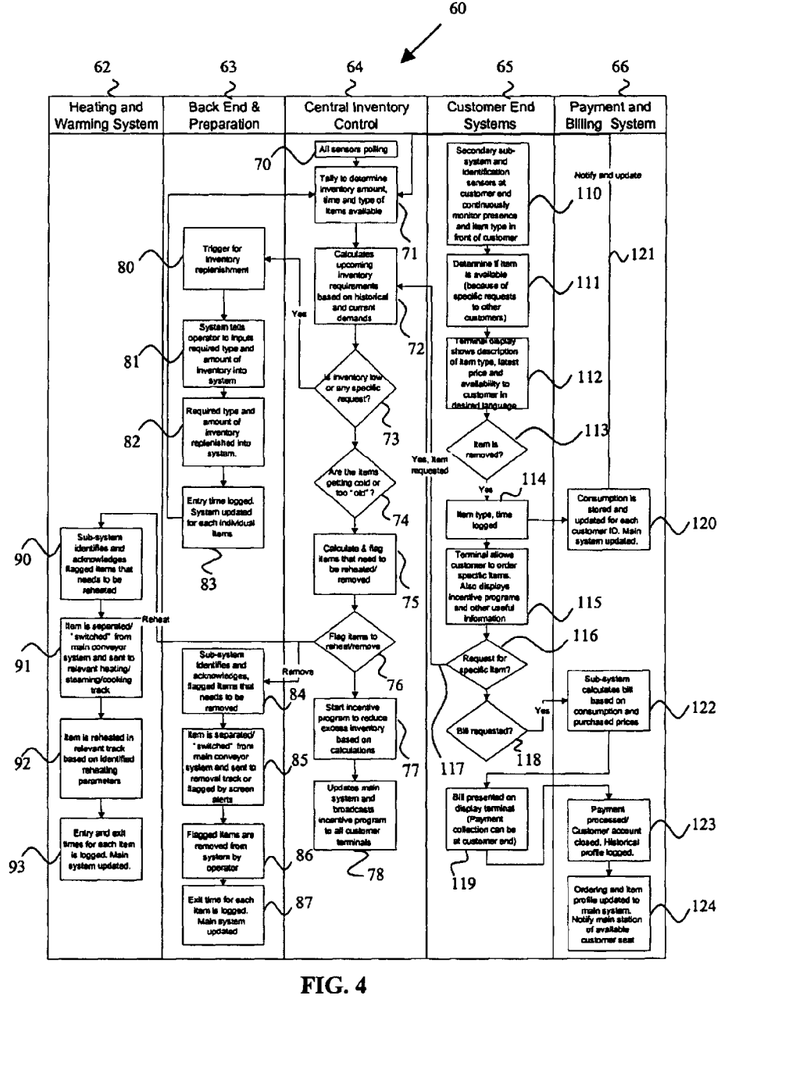
FIG. 4 is a flow diagram of a food management and inventory system according to the present invention.

FIG. 4 is a flow diagram of an inventory and food management system 60 ("hereinafter management system 60") according to the present invention for the above conveyor system 10. FIG. 4 shows the inventory and food management procedures described above in more detail as well as showing modifications to the above procedures. The management system 60 includes a heating and warming system 62, kitchen back end and food preparation system 63, central inventory control 64, customer end systems 65 and payment and billing system 66. The steps in the management system 60, as well as the management procedures described above, are typically controlled by a general purpose computer with software specifically written for implementing the system 60.

Starting from the central inventory control 64, the system 60 starts (step 70) with all sensors polling (ie. entry point sensors 20*a*, exit point sensors 22*a*, customer sensors 42 and kitchen sensors 52), wherein all sensors identify all the bases 100 in the conveyor system 10 and their food serving type and exposure time. This information is then tallied (step 71) to determine the inventory amount (identity and quantity of each type of food serving) and their exposure time. Based on historical and current demands, the system 60 (step 72) then calculates the current or upcoming inventory requirements, which informs staff on which food servings should be prepared in anticipation of such requirements. The system 60 then asks (step 73) if the inventory is low (ie. insufficient amount of specific food items) of if there are any special customer requests. If so, the kitchen back end and food preparation section 63 is triggered. Here (step 80), the staff is alerted to the required food serving. Staff is then told (step 81) of what food serving is required and how many. The required food serving is prepared (step 82) and introduced into the system. The entry time of the food serving is logged (step 83) and the inventory of the system 60 is updated. The system 60 then returns to produce a general tally (step 71).

From step 73, the system moves to step 74 where it is determined if food servings are getting too cold, too warm or too old. If not, the food servings rejoin the inventory tally (step 71). This equates to the food serving being diverted to the conveyor bypass path 23 and rejoining the conveyor customer section 14. If some food servings are getting too cold, too warm or too old, the bases 100 of such food servings are flagged (step 75) for reheating/recooling/removal. As these food items enter the food service section 16, they are diverted (step 76) to the heating path 24, cooling path 25 or removal track 26. As these items are reheated/recooled (to be explained further below), a customer incentive program is started (step 77) where these food items being reheated/recooled are marketed at a predetermined reduced price to customers via their customer screen 44 (step 78). The incentive program is started to reduce excess food serving items and avoid wastage. The reduced price food servings may also be alerted to customer screens 44 as they approach the customers.

If particular food servings are too old and need to be removed (step 76), the system moves identifies these food servings (step 84). These food servings are diverted (step 85) to the removal track 26 or are alerted to staff by alerts to computer screen 44. The food servings are removed by staff from the conveyor 12 or from the removal track 26 (step 86). The exit time for the food item is logged and the main inventory is updated (step 87).

If particular food servings require reheating/recooling (step 76), the system identifies these food servings (step 90). These food servings are diverted to the heating path 24 or the cooling path 25 (step 91). The food servings are reheated/recooled as required (step 92). The entry and exit time for the food serving is logged and the main inventory is updated (step 93). These food items then rejoin the main inventory (step 71) and may be flagged for the customer incentive system as described above.

At the customer stations 40, the customer end system 65 is in operation. Each customer station sensor 42 identifies the food serving type and price and advises the customer on his screen 44 (step 110). Each item is then identified if available to the customer or not, as it may be a specific order from another customer (step 111). The customer screen also shows the food serving type, latest price (it may have a reduced price from the incentive program) and its availability, in the customer's desired language (step 112). If the food serving is removed from the conveyor 12 (step 113), the food serving type, price and time are logged (step 114). The consumption of the food item is also logged for the customer (step 120). The general inventory (step 71) is then updated (arrow 121).

Each customer screen 44 allows the customer (step 115) to order specific food servings. If so (step 116), the specific food serving request is sent (arrow 117) to the inventory requirements (step 72). As described above, the specific request is flagged for the customer and is made unavailable to other customers. If the customer requests his bill (step 118), the bill is calculated (step 122) based on food servings consumed and their specific prices. The bills are then presented to the customer (step 119) via the customer screen 44 and payment is collected. The payment is processed (step 123) and the customer's account is closed. The historical profile of the customer will also be logged, including the food servings consumed. This information is passed to the main food management system (step 124) and staff are notified of an available customer seat, via a main staff screen.

Figure 5:
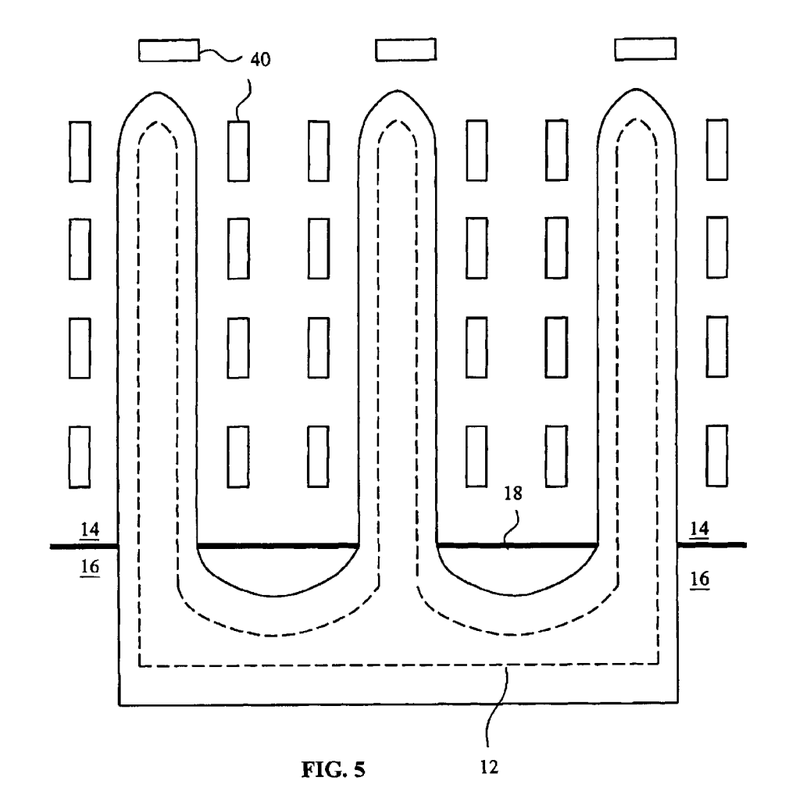
FIG. 5 is a layout diagram of another preferred sushi train restaurant layout.

The conveyor system 10 is described above as a conveyor belt. It is to be understood however that the present invention is also applicable to sushi tei type restaurants that use model trains on tracks and the like. Also, the customer section 14 and the food service section 16 can be configured as desired by the restaurateur. An example of a different configuration is shown in FIG. 5, which shows the conveyor 12, customer section 14, food service section 16 and customer stations 40.

The heating means 30 may be an open apparatus or one that appears like a tunnel in order for the conveyor to pass therethrough. This is similar to hamburger grilling ovens, where the rate of flow and the temperature determines the desired heating. In the present invention, the entire base 100 with the food serving can enter the oven or the food serving may be transferred to a different plate or a moving oven grill, reheated and then retransferred to the same base. Several different tunnels may be provided, for example, one for steaming, one for toasting heating and one for no action required.

Also, the conveyor paths 24 and 25 include heating and cooling means 30 and 32, respectively. In alternative embodiments, the cooling means 32 may not be required and may be replaced by a different form of heating means, such as a steamer, when the first heating means may be an oven. Also, it is possible to include more food processing diversion tracks to the conveyor 12, such as further heating paths or further cooling paths.

Furthermore, the various food heating/cooling means can be stacked one on top of the other to save space. The transport mechanisms for transferring the bases 100 to the various food processing means can then be designed according to the way the machines are arranged or stacked. For example, diverging and/or sloping conveying systems, escalators, or elevators may be used alone or in combination to bring the bases 100 to the respective processing means.

In the preferred embodiment, the management system 60 also keeps a memory of a demand for various food items according to the time of the day and the season in the year such that there can be a learning process as to customer taste to facilitate ordering of raw material.

Although radio frequency identification is the example used here for tagging each base 100, it is clear that many other types of identification system may be used, such as barcode in conjunction with an optical system and any other techniques that may be available according to the state of the art at the time of installation of the system 60. The bases 100 may be separately fitted with RF identification (RFID) or the RFID may be incorporated into the bases 100.

The customer stations 40 may serve eat-in customers as well as take-away customers. The take-away customer can order the food according to availability through the customer screen 44 and option buttons 46 and the food will be delivered to the customer accordingly. Alternatively, the customer may be given a take-away container and the customer may select food from the conveyor 12.

The management system 60 can be operated by a single central computer or several separate computers which are linked. The switching mechanism 27 can be similar to railway track switching mechanisms.

The preferred embodiment of the conveyor system and food management and inventory system presents numerous advantages:

1. The system virtually eliminates the need for waiters and attendants to take order or to deliver food.
2. The automated delivery system allows for a much more complex design of the various serving tables such as the one shown in FIG. 5.
3. The freshness of the food may be maintained, such as those for sashimi that requires a cool temperature. In this case, one of the processing modules may be a refrigerating system that cools the food as it passes through.
4. The system allows for the monitoring of customer needs on a daily/monthly or even yearly basis to determine the taste of the customers. As a result, the freshness of the food can also be ensured because the inventory level can be closely adjusted accordingly.
5. The inventory level on a real time basis also improves the freshness of the food as the chef can prepare new dishes only as and when they are depleted.
6. The data collected may also be used to determine customer profiles and preferences. Furthermore, information regarding the same customer may assist the vendor in anticipating the needs of the same customer, and also customize packages such as promotions.

Although preferred embodiments of the present invention have been described, it will be apparent to skilled persons that other modifications can be made to the above embodiments. For example, a sushi tei concept is used to illustrate the functions and features of the present invention, but any other types of food and outlets (including sit-down restaurants and take-away outlets) may also apply the same invention for handling, inventory control, monitoring and customer service. The treatment modules are generally described as different types of coolers and heaters, but it is within the scope of the claims to include other types of food treatment systems for benefit from the same invention. For example, a mist generating machine to ensure that moist cool food is kept moist.

What is claimed is:

1. A food conveyor system comprising:
a plurality of bases, each base supporting a serving of food;
a conveying system for automatically conveying the bases, the conveying system having a customer section and a food service section;
wherein the food service section includes:
an entry point receiving the bases from the customer section;
an exit point conveying the bases to the customer section;
a plurality of food processing conveyor paths extending between the entry point and the exit point;
means for diverting, at the entry point, each of the bases to one of the plurality of food processing conveyor paths; and
means for rejoining, at the exit point, the bases from the plurality of food processing conveyor paths;
wherein at least one food processing conveyor path includes means for adjusting the temperature of a serving of food on the at least one food processing conveyor path to a desired temperature.

2. The food conveyor system of claim 1, wherein one of the food processing conveyor paths is a bypass conveyor that conveys the bases directly from the entry point to the exit point.

3. The food conveyor system of claim 1, wherein one of the food processing conveyor paths is a heating path, and the means for adjusting the temperature includes means for heating food servings on the heating path.

4. The food conveyor system of claim 3, wherein the heating means comprises at least one of a conventional oven, a microwave oven, grill, steamer, and fryer.

5. The food conveyor system of claim 1, wherein one of the food processing conveyor paths is a cooling path, and the means for adjusting the temperature includes means for cooling food servings on the cooling path.

6. The food conveyor system of claim 5, wherein the cooling means comprises a cooler.

7. The food conveyor system of claim 1, further comprising a food removal track extending from the entry point, wherein the diverting means comprises means for diverting food servings to the food removal track for manual removal of the food servings from the food conveyor system.

8. The food conveyor system of claim 1, wherein each food processing conveyor path includes a buffer section for holding the bases until rejoined at the exit point by the rejoining means.

9. The food conveyor system of claim 1, wherein each base is individually electronically identifiable, the diverting means further comprising:
means for identifying each base and the type of food serving on the base; and
means for determining the proper food processing conveyor path to which each base is to be diverted according to the identification of the base and the type of food serving on the base.

10. The food conveyor system of claim 9, wherein the determining means is a computer.

11. The food conveyor system of claim 10, wherein the diverting means further comprises at least one sensor for identifying the bases at the entry point, the at least one sensor relaying base identification information to the computer.

12. The food conveyor system of claim 10, wherein the customer section is divided into a number of customer stations, each customer station having at least one sensor, each sensor identifying the bases removed from the food conveyor system by the customer and relaying information of the identity of removed bases to the computer for billing purposes.

13. The food conveyor system of claim 12, wherein each customer station includes a customer screen for displaying the type and price of food servings moving on the food conveyor system across the customer station.

14. The food conveyor system of claim 13, wherein each customer screen includes option buttons for providing ordering, billing and other restaurant functions to the customer.

15. The food conveyor system of claim 14, wherein the computer is adapted to display predetermined information on the customer screen, the predetermined information selected from a group consisting of nutritional information, ingredients used, and food background information.

16. The food conveyor system of claim 10, further including a kitchen terminal located at the food service section of the food conveyor system, the kitchen terminal having sensors, a screen, and a keyboard, wherein, in use, information regarding food servings introduced to the food conveyor system can be entered into the computer via the kitchen terminal.

17. A food management and inventory system for a sushi train restaurant, wherein a plurality of bases supporting food servings are conveyed along a closed loop conveyor having a customer section and a food service section, wherein each of the bases is individually electronically identifiable, wherein the food service section includes:
an entry point;
at least two food processing conveyor paths extending from the entry point, at least one of the food processing conveyor paths including means for altering the temperature of food servings on the conveyor path to a desired temperature;
means for diverting food servings at the entry point to one of the food processing conveyor paths; and
means for rejoining the food processing conveyor paths to each other at a food service section exit point that leads to the customer section;
wherein the food service section comprises at least one sensor at the entry point for identifying each base, the computer deciding to which of the food processing conveyor paths each base is to be diverted after identification of the base, the computer operating the diverting means to divert each base accordingly.

18. The system of claim 17, wherein the bases have an electronically identifiable tag comprising at least one of a barcode or radio frequency (RF) identification.

19. The system of claim 17, wherein the system includes a computer configured to receive information for each food serving introduced to the conveyor, the information including a base identification number and the type of food serving supported by the base.

20. The system of claim 19, wherein the system includes at least one sensor adjacent the conveyor, the at least one sensor identifying the bases currently on the conveyor and passing the identity of the bases to the computer for performing an inventory on the type and quantity of food servings currently on the conveyor.

21. The system of claim 19, further comprising:
- means for altering the temperature of food servings on the conveyor to a desired temperature; and
- at least one sensor adapted to identify a base currently passing along the conveyor and to pass the identity of the base to the computer for identification of the food item on the base;
- wherein the computer is further adapted to:
  - recall a predetermined preparation procedure for the food item;
  - direct the food item to the temperature altering means to bring the food serving on the conveyor to a desired temperature;
  - apply a predetermined preparation program to process the food item; and
  - command the conveyor to send the food item into the customer section.

22. The system of claim 19, wherein the customer section is divided into a number of customer stations, each customer station having at least one sensor, each sensor detecting and identifying the bases taken by the customer from the conveyor and transmitting the identity of the food serving to the computer for customer billing purposes.

23. The system of claim 22, wherein each customer station has a customer screen for displaying information of the type and price of the food serving on the base identified by the at least one sensor.

24. The system of claim 23, wherein the customer screen is configured to display the type and price of all food servings taken by the customer.

25. The system of claim 23, wherein the customer screen is configured to display a current bill total for the customer.

26. The system of claim 22, wherein the at least one sensor sends food serving information for all food servings consumed by the customers to the computer for system inventory and for monitoring the type and amount of food servings being consumed.

27. The system of claim 17, wherein one of the food processing conveyor paths is a bypass conveyor where food servings, which do not require a temperature change, travel from the entry point directly to the exit point.

28. The system of claim 17, wherein the computer:
- receives the time of introduction of each base to the conveyor;
- determines the exposure time for each particular food serving as being the time each food serving has been circulating on the conveyor; and
- deciding to which of the food processing paths each particular food serving is to be diverted.

29. The system of claim 17, wherein one of the food processing conveyor paths is a bypass conveyor that bypasses the temperature altering means, whereby food servings having a low exposure time can be diverted to the bypass conveyor.

30. The system of claim 17, further comprising a removal track that extends from the entry point, wherein the diverting means diverts food servings having an exposure time higher than a predetermined time for that particular food serving to the removal track for manual removal of the food servings from the food service section.

31. The system of claim 17, wherein one of the food processing conveyor paths is a heating path, the heating path including means for heating food servings on the heating path, wherein the diverting means diverts food servings that require re-heating to the heating path to increase the temperature of the food servings to a desired level.

32. The system of claim 17, wherein one of the food processing conveyor paths is a cooling path, the cooling path including means for cooling food servings on the cooling path, wherein the diverting means diverts food servings that require re-cooling to the cooling path to lower the temperature of the food servings to a desired level.

33. The system of claim 17, wherein the at least one sensor identifies the food servings on the conveyor and passes food serving identification information to the computer, the computer performing an inventory of the types of food servings on the conveyor, the quantity of each food serving, and which food servings are being depleted.

34. A food management and inventory system for a sushi train restaurant, wherein a plurality of bases supporting food servings are conveyed along a closed loop conveyor having a customer section and a food service section, wherein each of the bases is individually electronically identifiable;
- wherein the system includes a computer configured to receive information for each food serving introduced to the conveyor, the information including a base identification number and the type of food serving supported by the base;
- wherein the customer section is divided into a number of customer stations, each customer station having at least one sensor, each sensor detecting and identifying the bases taken by the customer from the conveyor and transmitting the identity of the food serving to the computer for customer billing purposes;
- wherein each customer station has a customer screen for displaying information of the type and price of the food serving on the base identified by the at least one sensor; and
- wherein the customer screen includes option buttons which allow the customer to order specific food servings from the kitchen for preparation by kitchen staff, the customer screen alerting the customer when the specific food serving is approaching the customer station.

35. The system of claim 34, wherein the customer screen at other customer stations alert other customers that the specific food serving is a special order and is not available to them.

36. The system of claim 34, further comprising means for passing information to the computer when the customer takes the specific food serving from the conveyor.

37. A method of managing food supply and food inventory, the method comprising:
- providing a system where food servings on bases are conveyed along an automated conveyor having a customer section and a food service section, wherein the bases are individually electronically identifiable;
- entering information into a computer regarding each food serving introduced to the conveyor, the information including a base identification number and the type of food serving on the base;
- using at least one sensor at the food service section to identify all the bases currently on the conveyor;
- sending the information related to the identity of the bases currently on the conveyor to the computer;
- performing an inventory to determine the food servings currently on the conveyor and the food servings being depleted at the customer section;
- determining type and exposure time of each food serving; and
- re-heating or re-cooling food serving based on exposure time and food serving type.

38. The method of claim 37, further including:

instructing kitchen staff to prepare food servings based on food servings being depleted; and introducing the food servings to the conveyor.

39. The method of claim 37, further including:

maintaining in computer memory a history of food serving depletion with respect to time of day, day of the week, month, and/or season;

determining anticipated food serving demand based on the history of food serving depletion for a similar time of day, day of the week, month, and/or season;

instructing kitchen staff to prepare amounts and types of food servings in anticipation of such demand.

40. The method of claim 37, further including:

entering the time of introduction of each base to the computer; and using the computer to determine the exposure time for each particular food serving as being the time each food serving has been circulating on the conveyor.

41. The method of claim 40, further including:

diverting food servings that have an exposure time higher than a predetermined time for that particular food serving to a designated area for manual removal.

42. The method of claim 37, further including:

advertising re-heated or re-cooled food servings to customers at a reduced price.

43. The method of claim 37, wherein the customer section is divided into a number of customer stations, the method further including:

identifying at each customer station bases removed by the customer from the conveyor; and passing information related to the type and price of the food serving on the removed bases to the computer for billing and inventory.

* * * * *